Jan. 10, 1956 G. L. FOGAL ET AL 2,730,315
PARACHUTE CANOPY
Filed Nov. 17, 1950 3 Sheets-Sheet 1

Inventors
G. L. FOGAL
A. M. MITNICK

By G. D. O'Brien
R. M. Hicks  Attorneys

Jan. 10, 1956   G. L. FOGAL ET AL   2,730,315
PARACHUTE CANOPY
Filed Nov. 17, 1950   3 Sheets-Sheet 2
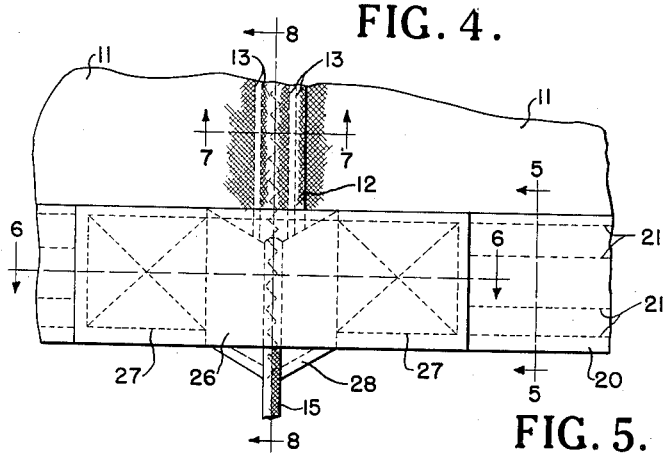
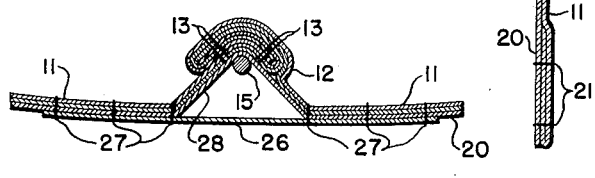
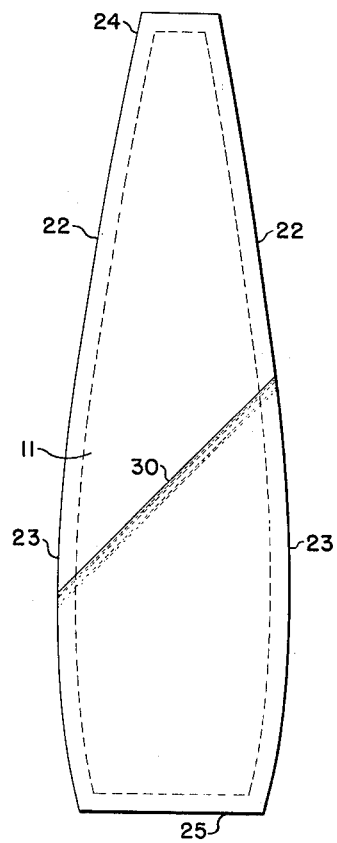
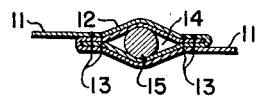
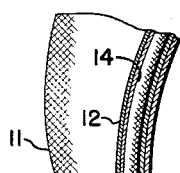
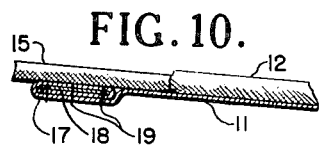
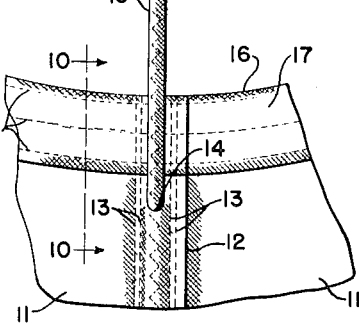
Inventors
G. L. FOGAL
A. M. MITNICK Jan. 10, 1956  G. L. FOGAL ET AL  2,730,315
PARACHUTE CANOPY Filed Nov. 17, 1950  3 Sheets-Sheet 3

Inventors
G. L. FOGAL
A. M. MITNICK

By G. D. O'Brien
R. M. Hicks  Attorneys

United States Patent Office 2,730,315
Patented Jan. 10, 1956

2,730,315

PARACHUTE CANOPY

Gordon L. Fogal and Albert M. Mitnick, Silver Spring, Md.

Application November 17, 1950, Serial No. 196,336

1 Claim. (Cl. 244—145)

(Granted under Title 35, U. S. Code (1952), sec. 266)

The present invention relates to parachutes and more particularly to a parachute canopy in which the gore sections are formed in such a manner as to relieve excessive localized stresses in the fabric of which the sections are formed. The canopy, which is of somewhat elliptical cross-sectional conformation, has a hem of less diameter than the maximum diameter of the canopy thus providing a shape thereto which inherently gives stability to the parachute during the descent thereof.

The sections or gores of the canopy are provided with an excess of material or fullness along the length thereof between the shroud lines, this excess fullness being greater at the crown, where the stress is greater than at the hem and thus a smaller cross-sectional radius of curvature of the gores is provided in the crown in proportion to the distance between the shroud lines at the crown than at the outer or hem edge thereof. Such excess fullness causes a bellying of the sections between the shroud lines and reduces the stresses incurred thereby and absorbs greater shock for a given strength of material than is possible where such excess fullness is not provided. Excess fullness as employed herein defines a greater width of gore material than is required to stretch substantially straight and tight between the shroud lines when the canopy is fully distended. This arrangement permits the use of light weight material in the gore sections, thus reducing cost while, at the same time, providing a strong gore section not readily ripped or torn in service.

The canopy is further provided with a hem construction which includes a plurality of take-up or pocket bands stitched to the hem band to form V-shaped pockets therein which together with the hem band relieves the gore sections of the greater part of the stress in the perimeter area.

An object of the present invention is to provide a parachute canopy having gore sections which have a lesser strength at the hem area where lesser stresses are present and a greater strength at the crown area where greater stresses are present.

Another object is to provide gore sections for a parachute canopy in which the excess fullness in width thereof substantially eliminates excessive localized stresses therein.

A further object is to provide a canopy for a parachute in which the circumferential stresses are applied to the hem thereof in such a manner as to relieve the gore sections of serious localized stresses in the hem area.

A still further object is to provide a parachute canopy in which localized stresses are substantially prevented in the gore sections to permit the use of lightweight fabric therein without reducing the strength or load carrying qualities thereof.

Other objects and many of the attendant advantages of this invention will become readily appreciated as the same becomes better understood by reference to the following detailed description when considered in connection with the accompanying drawings wherein:

Fig. 3 is a view of one of the gore sections illustrating the convex shape of the radial edges thereof;

Fig. 4 is a fragmentary view of the hem portion of the canopy;

Fig. 5 is a sectional view on line 5—5 of Fig. 4;

Fig. 6 is a sectional view on line 6—6 of Fig. 4;

Fig. 7 is a sectional view taken on line 7—7 of Fig. 4;

Fig. 8 is a sectional view taken on line 8—8 of Fig. 4;

Fig. 9 is a fragmentary plan view of a portion of the crown of the canopy;

Fig. 10 is a section taken along line 10—10 of Fig. 9;

Figure 1:
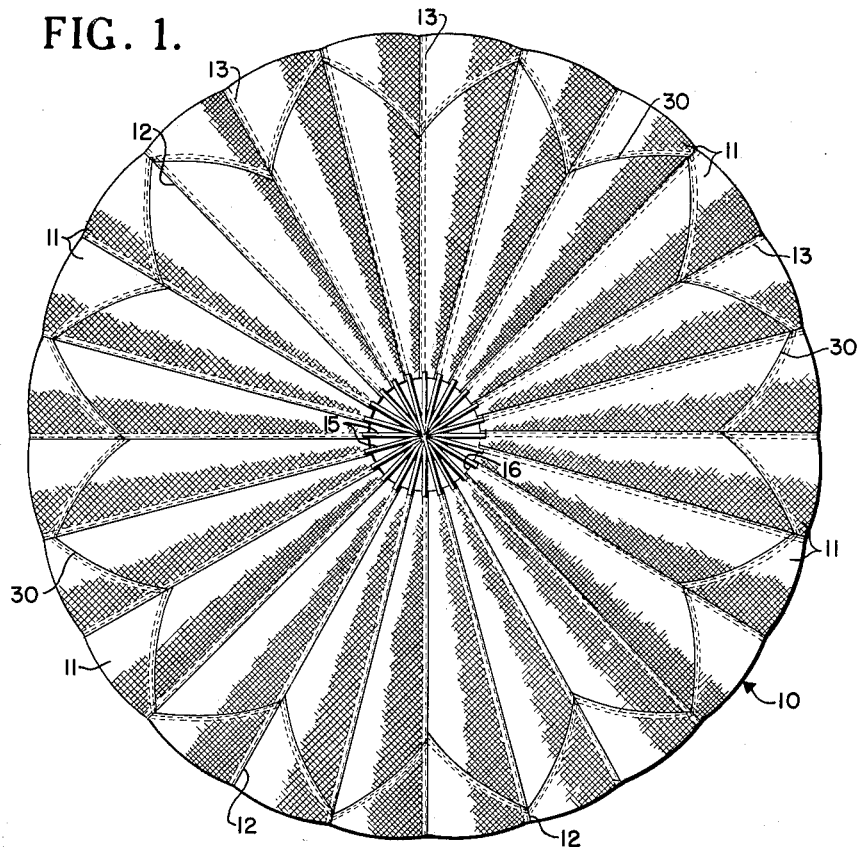
Fig. 1 is a view in top plan of the parachute canopy of the present invention.
Figure 2:
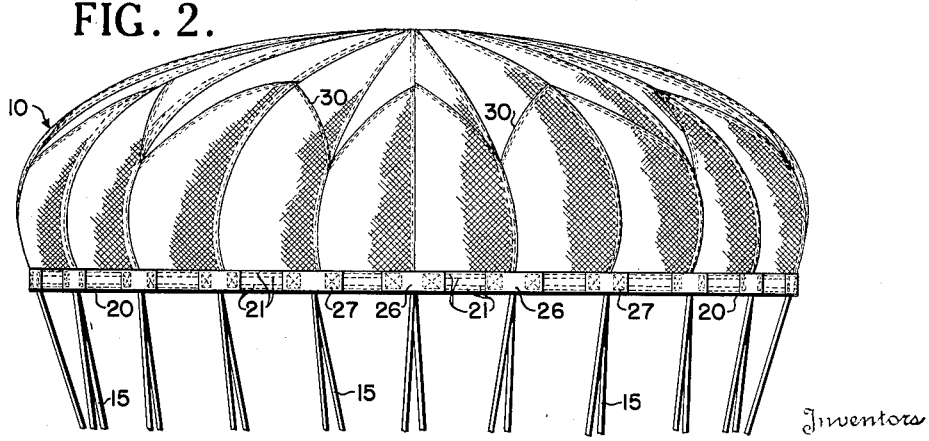
Fig. 2 is a view in side elevation of the canopy, the shroud lines thereof being broken away.

Referring more particularly to the drawings wherein like numerals indicate like parts throughout the several views the numeral 10 indicates generally the parachute canopy of the present invention. The canopy 10 comprises a plurality of gore sections 11 joined together at the abutting edges thereof by radial seams 12, the lines of stitching 13 being spaced to provide a tunnel 14 therebetween for receiving a shroud line 15 at each radial seam.

A crown vent opening 16 is formed in the canopy 10. Each of the shroud lines 15 passes out of the tunnel 14 therefor adjacent the opening 16 and crosses the other shroud lines at the center of opening 16 to enter the tunnel 14 at the diametrically opposite side of the opening. A double folded hem 17 is formed at the inner ends of sections 11 around the edge of opening 16 and a continuous reinforcing tape 18 is secured therein by a plurality of rows of stitching 19.

The outer peripheral edges of the sections 11 have secured thereto a continuous circumferential hem band 20 which forms the outer periphery of canopy 10. The edges of sections 11 are folded over and the hem band 20 is secured thereto by a plurality of rows of stitching 21.

The gore sections 11 are each formed as indicated in Figs. 3, 11, 12 and 13 with a greater fullness in width than is required to form the usual taut radial gore canopy, the fullness being less adjacent the perimeter or outer periphery of the canopy and being greater at the inner edge thereof, as will be hereinafter more fully described. The sections 11 have the side edges thereof curved outwardly as at 22, the wider portion 23 being spaced from the outer edge 25 thereof, the narrower portion 24 being at the inner edge thereof, and the outer edge 25 being of a width somewhat intermediate the wider and the narrower portions.

In order to provide the hem band 20 with a lesser circumference than the normal assembled circumference of the sections 11, a plurality of take-up or pocket bands 26 are stitched to the hem band, one of the bands 26 being applied at the point where each of the seams 12 enters the hem band 20. The bands 26 are stitched as at 27 to the hem band in the manner particularly well shown in Fig. 4 wherein box-X stitching is preferably employed for this purpose and a predetermined amount of excess material is provided at the hem band 20 to form a V-shape 28 therein at the point of juncture with seams 12.

Figure 11:
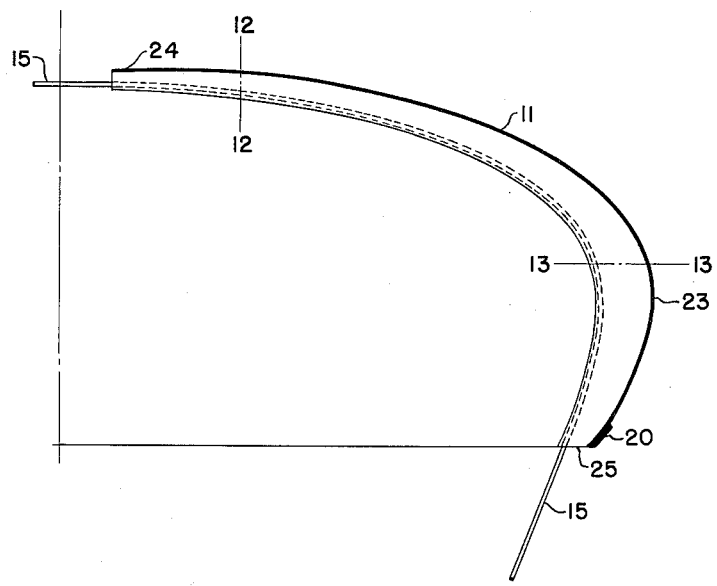
Fig. 11 is a schematic sectional view of one of the gore sections of the canopy.
Figures 12, 13:
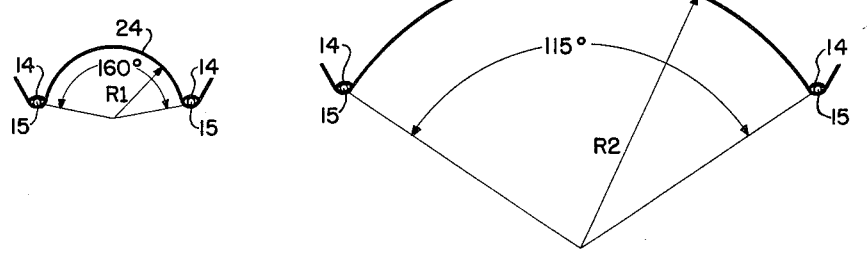
Fig. 12 is a schematic sectional view taken along line 12—12 of Fig. 11.
Fig. 13 is a schematic sectional view taken along line 13—13 of Fig. 12.

As disclosed in Fig. 11 which is a schematic sectional view taken along a radial line through the center of one of the sections 11 it is apparent that there is a fullness to the section 11 throughout the radial length thereof from the portion 24 at vent opening 16 to the outer edge 25, with the greater fullness at point 23. Fig. 12 indicates that while radius R1 is small the material extends approximately 160° around radius R1 which imparts to the portion 24 the high strength characteristics required in the crown portion. Fig. 13 indicates that while radius R2 is large the material extends approximately only 115° around radius R2 which imparts to the portion 23 the lesser strength characteristics required in this portion of the canopy. The object of such arrangement is to substantially reduce localized stresses in the fabric of which the sections 11 are formed thus permitting the use of lightweight fabrics without danger of ripping or tearing of the sections. Furthermore, it is particularly important that the excess fullness of the sections extend all the way to the vent opening where the stresses are greater and the danger of ripping is especially serious.

If desired the gore sections 11 may be made of more than one piece of material, the pieces being joined by a diagonal seam 30 as indicated in Fig. 3.

Obviously many modifications and variations of the present invention are possible in the light of the above teachings. It is therefore to be understood that within the scope of the appended claim the invention may be practiced otherwise than as specifically described.

The invention described herein may be manufactured and used by or for the Government of the United States of America for governmental purposes without the payment of royalties thereon or therefor.

What is claimed and desired to be protected by Letters Patent of the United States is:

A parachute of truncated elliptical cross section having a vent opening in the crown thereof and having shroud lines which intersect at the crown vent and pass over the peripheral hem and comprising a plurality of radial gore sections of generally increasing arc length in transverse cross section joined by stitched tubular seams at the radial edges thereof, said gore sections having excess fullness of width of decreasing degree of curvature from said vent to a region at the maximum periphery and thereafter termintaing in a circular hem portion, said tubular seams receiving the shroud lines of said parachute, a plurality of equally spaced take-up tapes secured at the ends thereof to said peripheral hem, each of said tapes taking up a portion of the hem of greater length than the tapes between the points of attachment of each of said tapes, said shroud lines passing between the take-up tapes and the hem whereby a substantially triangular opening is formed between each of the tapes and the hem, the shroud lines being at the inner apexes of the triangular openings, said shroud lines drawing in the gore sections at the seams thereof, the excess fullness of the sections providing a substantial cross-sectional radius to each of the sections which varies with respect to width from a lesser cross-sectional radius adjacent the crown vent to a greater cross-sectional radius at the maximum periphery and terminating into said triangular opening adjacent the peripheral hem thereby to provide greater strength to the gore sections adjacent the crown vent and a lesser strength thereto adjacent the peripheral hem.

References Cited in the file of this patent

UNITED STATES PATENTS

| | | |
|---|---|---|
| 1,631,766 | Russell | June 7, 1927 |
| 1,849,965 | Switlik | Mar. 15, 1932 |
| 2,318,674 | Coleman | May 11, 1943 |
| 2,356,493 | Smith | Aug. 22, 1944 |
| 2,379,758 | Smith | July 3, 1945 |
| 2,426,926 | Frieder | Sept. 2, 1947 |

FOREIGN PATENTS

| | | |
|---|---|---|
| 30,540 | France | Mar. 23, 1926 |
| | (Addition to No. 553,653) | |
| 402,958 | Italy | Mar. 30, 1943 |